Patented Nov. 15, 1949

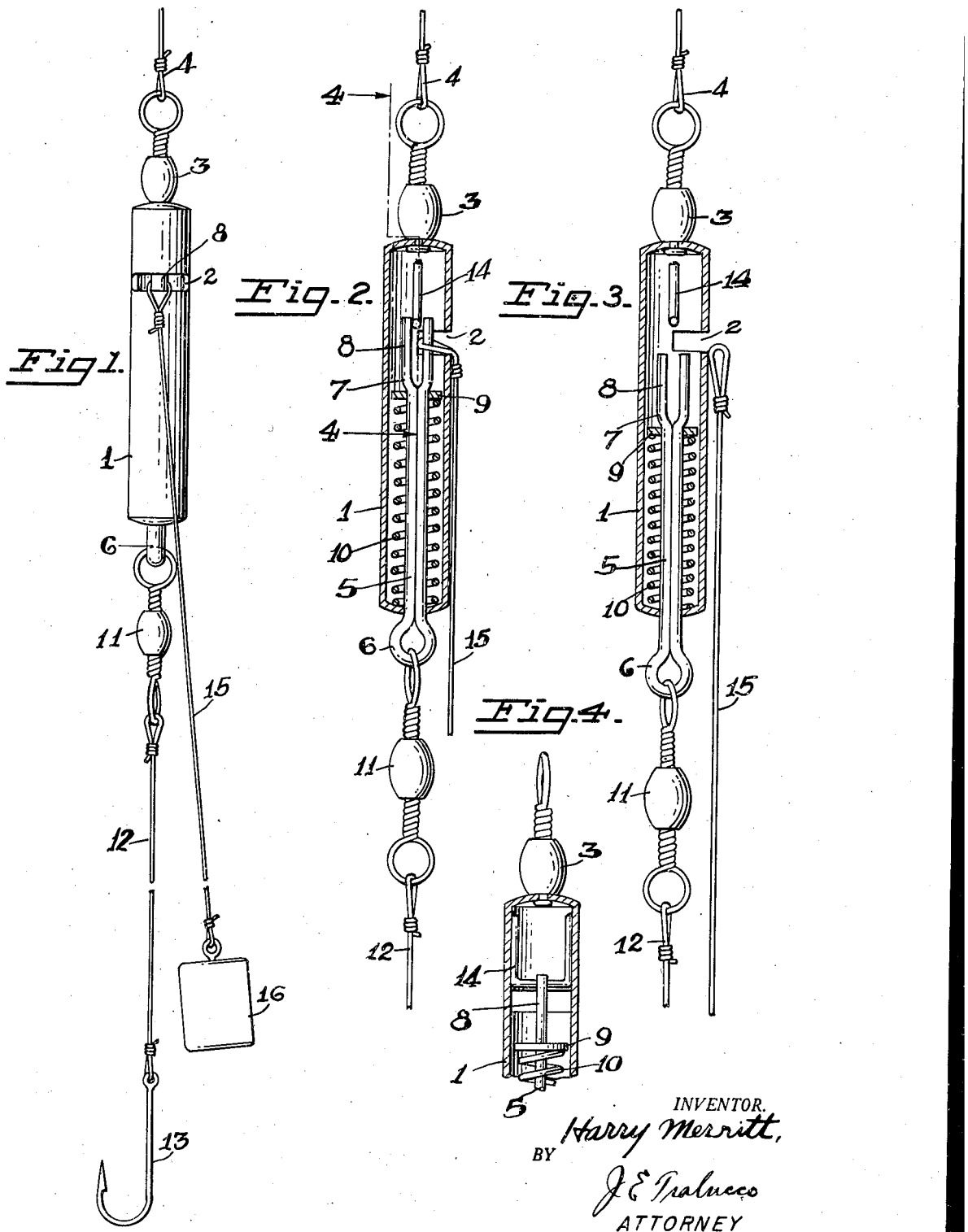

2,488,475

UNITED STATES PATENT OFFICE 2,488,475

SINKER RELEASING DEVICE

Harry Merritt, Crescent City, Calif.

Application October 4, 1948, Serial No. 52,699

1 Claim. (Cl. 43—52)

This invention relates to improvements in fishing tackle and more particularly to a novel sinker releasing device.

An object of the present invention is to provide a novel sinker releasing device which automatically releases the sinker when a fish is caught.

Another object of my invention is to provide a novel device of the kind characterized, embodying means which permits the automatic detachment of a sinker from a fishing line when a fish is caught, thereby removing a dead weight from the line, thus decreasing the load on the line while at the same time making it possible for increased pleasure to be derived from the fishing operation.

Other and further objects of my invention will be pointed out hereinafter, or will be indicated in the appended claim, or will be obvious to one skilled in the art upon an understanding of the present disclosure. For the purpose of this application I have elected to show herein certain forms and details of a sinker release device representative of my invention; it is to be understood, however, that the embodiment of my invention herein shown and described is for illustration purposes only and that therefore it is not to be regarded as exhaustive of the variations of the invention.

In the accompanying drawings:

Fig. 1 is a side elevation of a sinker releasing device embodying my invention showing it operatively associated with a fishing line and a weight member;

Fig. 2 is a longitudinal sectional view of the device showing the cord to which a weight member is normally attached in a connected position with respect to the forked releasable retainer;

Fig. 3 is a similar view showing the cord released; and

Fig. 4 is a fragmentary sectional view taken on the line 4—4 of Fig. 2.

Referring to the drawings, the numeral 1 designates an elongated cylindrical casing having an opening or slot 2 in its side wall. Suitably connected to the upper closed end of the casing is a swivel 3 which has a looped end for the attachment of a fishing line 4. Slidably extending through an opening in the opposite end of the casing is a retainer 5 which comprises a looped member 6 positioned externally of the casing and two upwardly disposed adjacent legs, the upper ends of which are bent outwardly and separated as at 7 to provide forked members 8. The forked members 8 of the retainer 5 extend across the opening 2 in the side of the casing 1 and substantially above the upper edge thereof.

Interposed between the lower end of the casing and a washer 9 which abuts the outwardly disposed portions 7 of the retainer 5 is a compression spring 10. The spring normally but yieldably maintains the forked members 8 of the retainer in positions in which their upper ends extend well above the opening 2 in the casing.

Attached to the looped member 6 of the retainer is a swivel 11 which has a leader 12 connected thereto, the said leader being connected to a hook 13 in the usual manner.

A U-shaped member 14 secured inside the upper end of the casing 1 extends between the forked members 8 when they are in their normal positions, thereby preventing the retainer from turning independently of the casing during the fishing operation and while the device is in use.

Attached to one of the forked members 8 is the looped end of a cord 15 or the like, the said cord having a weight member 16 secured to its opposite end.

In operation the coiled spring 10 maintains the retainer 5 in a position in which the engaged forked member 8 maintains the cord 15 in attached relation thereto. The weight member 16 remains in connected relationship with respect to the device until a fish is hooked and at that particular time the pull exerted on the retainer 5 causes the spring to contract and allow the said retainer to move outwardly from the casing and thereby carry the forked members 8 past the opening 2 in the casing to positions in which the looped end of the cord 15 is released. The weight upon being thus detached from the fishing line, permits the fishing operation to proceed without the undesirable presence of a substantial weight on the line in addition to the fish. When the fish is hooked the spring 10 acts as a shock absorber to normally prevent damage to the fishing equipment and substantial injury to the fish's mouth.

What I claim is:

A sinker releasing device comprising an elongated casing having an opening in its side, a swivel secured to one end of the casing, a yieldable member movably extending through the opposite end of the casing, the said yieldable member having a looped portion disposed externally of the casing and a longitudinally disposed pair of legs extending inside the casing and across the side opening thereof, a coiled spring interposed under tension between an abutment secured to the legs of the yieldable member and an end of the casing, the said spring normally but yieldably holding the yieldable member in a position in which its legs extend across the opening in the side of the casing whereby, a sinker cord may extend through the side opening in the casing and be releasably secured to one of the legs of the yieldable member, and fixed means secured to the casing and arranged between the legs of the yieldable member when in a normal position for preventing the rotation thereof.

HARRY MERRITT.

REFERENCES CITED

The following references are of record in the file of this patent:

UNITED STATES PATENTS

| Number | Name | Date |
|---|---|---|
| 1,296,370 | Darling | Mar. 4, 1919 |